United States Patent Office 3,404,197

Patented Oct. 1, 1968

3,404,197

COATING COMPOSITIONS COMPRISING A MIXTURE OF: (1) A PHENOL-FORMALDEHYDE RESIN; (2) A MELAMINE-ALDEHYDE RESIN; (3) A POLYISOCYANATE AND (4) A BLEND OF HIGH AND LOW MOLECULAR WEIGHT POLYVINYL FORMAL RESINS

Lionel J. Payette, Scotia, N.Y., assignor to General Electric Company, a corporation of New York No Drawing. Filed Oct. 10, 1966, Ser. No. 585,257

9 Claims. (Cl. 260—839)

ABSTRACT OF THE DISCLOSURE

Higher wire coating speeds and curing temperatures are possible with polyvinyl formal resin base coating compositions when blends of high and low molecular weight polyvinyl formal resins are used.

This invention relates to electrical insulating compositions and to electrical conductors coated therewith. More particularly, it relates to electrical insulation having a polyvinyl acetal base, which insulation is characterized by its ready coatability on electrical conductors at a high speed to provide insulated conductors having desirable electrical and physical characteristics. It is particularly adapted to being coated on electrical conductors at high speeds which permit substantial increases in the rate of production of insulated wire.

The use of polyvinyl acetal based electrical insulating compositions or enamels is well known. Such materails have over the years of their development been changed and tailored to fit various requirements. With the increasing use of electrical equipment at elevated temperatures, such materials have been modified to withstand substantially higher temperatures without electrical and mechanical failure. Among the patents relating to such polyvinyl acetal based materials are 2,307,588 and 2,730,466 assigned to the same assignee as this invention. Other patents relating to such materials include 3,037,959; 3,067,063; 3,068,189; 3,069,379; 3,077,462; 3,072,596; 3,072, 597 and 3,104,236 among others.

While the electrical and physical characteristics of electrical insulating compositions and electrical conductors insulated therewith are of prime importance it is also desirable that such insulated conductors be produced as economically as possible. An important factor in such economical production of insulated conductors is time. Anything which can be done to reduce the time of production of such products consistent with the attainment of good electrical and physical characteristics is of the utmost importance. It is a primary object of the present invention, therefore, to provide electrical insulating materials and electrical conductors coated with such materials which are possessed of good electrical and physical properties and improved resistance to organic solvent and which may be applied to the wire in a minimum of time.

Briefly, the present invention relates to electrical insulating materials which comprise a balanced combination of particular polyvinyl acetal, isocyanate material, phenolic resin, and aminotriazine or melamine formaldehyde resin which can be quickly applied to electrical conductors to produce insulation possessed of good eletcrical and physical characteristics.

Those features of the invention which are believed to be be novel are set forth with particularity in the claims appended hereto. The invention will, however, be better understood and further advantages and objects thereof appreciated from a consideration of the following description.

The polyvinyl acetal resins used in conjunction with the present invention are hydrolyzed polymerized vinyl ester aldehyde condensation products derived from various aldehydes and polyvinyl esters as set forth in the patent and other literature, including reissue patent 20,430, among others. While the preferred aldehyde used is formaldehyde and the preferred polyvinyl ester is polyvinyl acetate, other starting materials may be used. Among the aldehydes which are suitable are acetaldehyde, propionic aldehyde, butyric aldehyde, benzaldehyde, and others well known to those skilled in the art. Other polyvinyl esters which are useful include polyvinyl propionate, polyvinyl butyrate, and the like. The properties of the polyvinyl acetal resins can be altered by varying the viscosity and the degree of hydrolyzation of the polyvinyl ester, the amount and character of the aldehyde resin reacted with the hydrolyzed polymerized vinyl ester and the nature and quantity of the acid catalyst used. Generally speaking, the preferred materials contain from 1 to 35% by weight of ester groups calculated as polyvinyl ester and from about 3 to 15% by weight hydroxyl groups expressed as polyvinyl alcohol, the balance being substantially formaldehyde acetal.

Typical of the polyvinyl acetal materials useful in connection with the present invention is a material sold as "Formvar 7/95E" by the Shawinigan Resins Corporation. This material contains from about 5 to 6.5% by weight hydroxyl expressed as percent polyvinyl alcohol and 9.5 to 13% acetate expressed as polyvinyl acetate and about 82% formal content expressed as polyvinyl formal. The molecular weight of this material ranges on the average from about 16,000 to 20,000 and the specific gravity is 1.277. Another material of this type useful in the present connection is "Formvar 15/95E." This material has a molecular weight of from about 24,000 to 40,000, a hydroxyl content expressed as percent polyvinyl alcohol of 5.0 to 6.0%, an acetate content expressed as percent polyvinyl acetate of from 9.5 to 13.0% and a formal content expressed as percent polyvinyl formal of about 82% and a specific gravity of 1.227.

The isocyanate materials useful in connection with the invention can vary widely and are typically the reaction products of an isocyanate such as tolylene diisocyanate, naphthalene diisocyanate, 1,6-hexane diisocyanate, etc., with a polyol in proper equivalent proportions, such polyols including glycerol, ethylene glycol, diethylene glycol, propylene glycol, dipropylene glycol, trimethylol ethane or propane, hexane triol and the like. For example, propylene glycol can be combined in the proportion of one mole for each two moles of tolylene diisocyanate, the same proportions being used in the combination of dipropylene glycol and tolylene diisocyanate. When trimethylol propane is used, one mole is used for three moles of tolylene diisocyanate. The polyisocyanate material can be left unblocked, but this is not desirable from safety and other considerations. Preferably, it is blocked in a well-known manner with such materials as phenols. A material known as "Trancoa 3A" and manufactured by the Trancoa Chemical Corporation is the reaction product of one mole of trimethylol propane with three moles of tolylene diisocyanate, the end product being blocked with phenol. It will be realized also that the polyisocyanate can be used without reaction with polyols, the purpose of the latter being to reduce the vapor pressure of the isocyanate and to facilitate reaction. The polyisocyanate material imparts good solvent resistance. Where this property is not important relatively low amounts of isocyanate can be used for good cutthrough or it can be omitted entirely.

The phenolic materials used in connection with the present invention are well known and are described in Patent 2,307,588 and elsewhere in the literature, these materials being the reaction product of a phenol and an aldehyde.

Among the preferred phenol materials are phenol and the various cresols, and while any of a number of aldehydes as set forth above can be used, formaldehyde is the usual reactant of this type.

The melamine type resins used in the present invention are also well known. Generally speaking, these materials comprise the condensation products of aminotriazines such as melamine with aldehydes and alkylated condensation reaction products of aminotriazines such as melamine with aldehydes obtained as by reacting melamine and an aldehyde in the presence of an alcohol. The preparation of such materials is well known. For example, melamine-aldehyde reaction products can be prepared by reacting with one mole of melamine at least two moles of an aldehyde such as formaldehyde under alkaline conditions. Typical of commercial products of this type are "Resimene 882" produced by the Monsanto Company which contains 66% melamine formaldehyde solids in xylene.

As pointed out above, a primary object of the present invention is to provide electrical insulating materials and electrical conductors insulated therewith which are possessed of desirable electrical and physical properties. At one and the same time, it is an object of the invention to provide materials which can be used to insulate conductors in a minimum of time. In order to arrive at good physical and electrical properties, it has been found desirable to modify the polyvinyl acetal based resin with other materials such as phenolic resins, isocyanate, urethanes, and the like. It has further been found, however, that generally such modified materials do not coat readily on electrical conductors at usual application temperatures at relatively high speeds of the order of up to 50 to 60 feet per minute. Generally, it has been found that when high speeds of 50 to 60 feet per minute are used in coating prior art materials at temperatures of the order of about 400°–450° C., control temperature blistering of the enamel occurs, resulting in defective insulation. Further, the cut-through or ability of the insulation to withstand pressure at elevated temperatures in actual use leaves much to be desired. Furthermore, the extractable material, such as that which is extracted by methanol in a specific test described hereafter, is high, indicating the retention of excessive volatile materials which are removed from the insulation over long periods of time at elevated temperatures during actual use and which contribute to its deterioration. When it is sought to coat prior art materials on electrical conductors at speeds of 50 to 60 feet per minute and upward, the resultant coating is characterized by poor concentricity.

It was found that when a polyvinyl acetal having a relatively low molecular weight was blended with the high molecular weight polyvinyl acetal normally used in prior art compositions, insulating compositions resulted which could be applied at substantially higher speeds of the order of 60 feet per minute to provide an economically manufactured insulated wire possessed of good electrical and physical qualities.

Generally speaking, it has been found that when from about 25% to 75% of the polyvinyl acetal is of the above low molecular weight type, the desirable results of the invention are obtained. As to the other ingredients, it has been found that for each 100 parts by weight of polyvinyl acetal, a discrete amount up to about 10 parts by weight of phenol formaldehyde may be used, and preferably from about 5 to 25 parts to obtain varying characteristics well known to those skilled in the art. Generally speaking, the melamine or aminotriazine resin is used in amounts ranging from about 1 part to about 15 parts. It has been found that if over about 20 parts are used per 100 parts of polyvinyl acetal, losses occur in high temperature properties such as flexibility and thermal life. As to the polyisocyanate, it has been found that when over about 20 to 100 parts are used, there is no added gain in cut-through.

The following examples illustrate and point out the advantages of the present invention, it being realized that they are not to be taken as limiting in any way.

Example 1

There was prepared an insulating composition consisting of by weight 100 parts of polyvinyl formal resin having a molecular weight of from about 24,000 to 40,000 described above as "Formvar 15/95E." There were blended with the polyvinyl formal 7.5 parts of phenol formaldehyde in cresylic acid solution along with 120 parts of "Trancoa 3A" solution to provide 60.0 parts of polyisocyanate. There were also added 3.7 parts of melamine formaldehyde resin in the form of "Resimene 882" which consists of 66% melamine formaldehyde resin solids in xylene. The above ingredients were mixed with solvents consisting of 352 parts by weight of xylene and 23.8 parts of cresylic acid. The enamel so prepared was coated on a copper conductor 40.3 mils in diameter to a thickness of 3 mils at speeds of 46 and 54 feet per minute with a curing control temperature at the top of the oven of 500° C. and 250° C. at the bottom.

Example 2

Example 1 was repeated in every respect except that the polyvinyl acetal consisted of 75% by weight "Formvar 15/95E" having a molecular weight of from about 24,000 to 40,000 and 25% by weight "Formvar 7/95E" having a molecular weight ranging from about 16,000 to 20,000. The enamel so prepared was coated on 4.3 mil diameter copper wire to a thicknes of 3 mils, at speeds of 46 feet per minute and 54 feet per minute with a curing temperature at the top of the oven of 500° C. and 250° C. at the bottom.

Example 3

Example 1 was repeated in every respect except that the polyvinyl acetal used consisted of 50% by weight each of "Formvar 7/95E" and "Formvar 15/95E." The enamel was coated on 40.3 mil diameter copper wire to a thickness of 3 mils, at speeds of 46 feet per minute and 54 feet per minute with a curing temperature at the top of the tower of 500° C. and 250° C. at the bottom of the tower.

Example 4

Example 1 was repeated except that for the polyvinyl acetal component there was used 25% by weight of "Formvar 15/95E" and 75% by weight of "Formvar 7/95E." The enamel was coated on 40.3 mil diameter copper wire to a thickness of 3 mils at speeds of 46 feet per minute and 54 feet per minute.

Example 5

Example 1 was repeated in every respect except that there was used for the polyvinyl acetal component 100% of "Formvar 7/95E" having a relatively low molecular weight ranging from about 16,000 to 20,000. The enamel so prepared was coated on 40.3 mil diameter copper wire to a thickness of 3 mils at speeds of 46 feet per minute and 54 feet per minute with a curing temperature of 500° C. at the top of the tower and a curing temperature of 250° C. at the bottom of the tower.

The insulated electrical conductors of the above examples were tested in various manners. For example, the cut-through of the insulated conductors was measured by placing two lengths of wire, one over the other, at an angle of 90° C. and placing a load of 1,000 grams at the intersection of the two wires with the temperature gradually being raised to that point at which the coating was cut through to provide electrical conduction between the wires, this temperature being taken as the cut-through temperature. The coatings were examined visually and by touch for smoothness of coating, B+ and B being extremely smooth wire, C+ wire having an occasional waviness of the coating but still commercially acceptable. The solvent resistance of the enamel which is an indication of ability to withstand chemical stresses in electrical applications was tested by boiling the coated wire under reflux for ten minutes in a 50–50 by volume mixture of ethanol and toluene. Any blistering or swelling after the test period is an indication of unacceptability of the insulation. The coatings were tested for methanol extraction by determining the loss of weight of a coated wire after being immersed for two hours at reflux in methanol and dried for one hour at 150° C. in an air-circulating oven.

Shown in the table below are the results of the above described tests on the materials of the above examples.

| Ex. | Speed (ft. min.) | Smoothness | Methanol extraction (percent) | Toluene methanol extraction (percent) | Percent dissipation factor (180° C.) |
|---|---|---|---|---|---|
| 1 | 46 | B− | 0.5 | 0.9 | 17.0 |
| | 54 | C+ | 0.8 | 0.85 | 12.9 |
| 2 | 46 | B+ | 0.7 | 1.4 | 22.1 |
| | 54 | B | 1.0 | 1.2 | 12.4 |
| 3 | 46 | B+ | 1.1 | 2.1 | 20. |
| | 54 | B+ | 0.5 | 0.8 | 11.4 |
| 4 | 46 | B+ | 0.7 | 1.8 | 19.5 |
| | 54 | B | 0.8 | .8 | 12.4 |
| 5 | 46 | B+ | 1.5 | 2.5 | 25.0 |
| | 54 | C+ | .65 | 1.0 | 13.1 |

From the above it will be noted that when from 25 to 75% of the relatively low molecular weight polyvinyl acetal or "Formvar 7/95E" was used, the smoothness and the methanol extraction as well as the other characteristics of the coated wire tested were satisfactory. On the other hand, when less than 25% of the lower molecular weight polyvinyl acetal was used as in Example 1, the smoothness was unsatisfactory at higher speeds. At the other extreme, when the polyvinyl acetal component consisted entirely of the relatively low molecular weight material or "Formvar 7/95E" again the smoothness at high speeds was poor.

There are provided, then, by the present invention salutary wire enamels which can be applied to wire at high speeds and cured at relatively high temperatures, resulting in desirable increases in production, whereas prior art enamels when applied at relatively high speeds and cured at relatively high temperatures tend to blister, have low cut-through, high methanol extraction and poor concentricity. The present enamels provide the opposites of these poor prior art characteristics in providing smooth, concentric coatings which are free of blistering and characterized by good cut-through and low extractables.

What I claim as new and desire to secure by Letters Patent is:

1. A composition comprising by weight 100 parts polyvinyl formal, a discrete amount up to about ten parts of phenol formaldehyde resin, from about two to five parts melamine aldehyde resin and about sixty parts polyisocyanate, said polyvinyl acetal consisting of from about 25% to 75% by weight of polyvinyl formal having a molecular weight of from about 16,000 to 20,000, the remainder of the polyvinyl formal having a molecular weight of from about 24,000 to 40,000.

2. A composition as in claim 1 in which there are about 7.5 parts of phenol formaldehyde resin, about 3.7 parts melamine aldehyde resin and about sixty parts polyisocyanate and in which said polyvinyl formal consists of about 25% by weight of polyvinyl formal having a molecular weight of from about 16,000 to 20,000 with the remainder of said polyvinyl formal having a molecular weight of from about 24,000 to 40,000.

3. A composition as in claim 2 wherein the polyvinyl formal consists of about 50% by weight of polyvinyl formal having a molecular weight of from about 16,000 to 20,000 with the remainder of said polyvinyl formal having a molecular weight of from about 24,000 to 40,000.

4. A composition as in claim 2 in which said polyvinyl formal consists of about 75% by weight of polyvinyl formal having a molecular weight of from about 16,000 to 20,000 with the remainder of said polyvinyl formal having a molecular weight of from about 24,000 to 40,000.

5. An electrical conductor coated with the heat-cured material of claim 1.

6. An electrical conductor coated with the heat-cured material of claim 2.

7. An electrical conductor coated with the heat-cured material of claim 3.

8. An electrical conductor coated with the heat-cured material of claim 4.

9. A wire enamel comprising by weight 100 parts polyvinyl formal, a discrete amount up to about ten parts of phenol formaldehyde resin, from about two to five parts melamine aldehyde resin and about sixty parts polyisocyanate, said polyvinyl acetal consisting of from about 25% to 75% by weight of polyvinyl formal having a molecular weight of from about 16,000 to 20,000, the remainder of the polyvinyl formal having a molecular weight of from about 24,000 to 40,000, along with a suitable solvent.

References Cited

UNITED STATES PATENTS 2,730,466 1/1956 Daszewski ---------- 260—839
3,068,189 12/1962 Lavin et al. --------- 260—839
3,069,379 12/1962 Lavin et al. --------- 260—844
3,072,596 1/1963 Lavin et al. --------- 260—839
3,104,236 12/1963 Lavin et al. --------- 260—839

MURRAY TILLMAN, *Primary Examiner.*

J. C. BLEUTGE, *Assistant Examiner.*

U.S. DEPARTMENT OF COMMERCE

PATENT OFFICE

Washington, D.C. 20231

UNITED STATES PATENT OFFICE

CERTIFICATE OF CORRECTION

Patent No. 3,404,197 October 1, 1968

Lionel J. Payette

It is certified that error appears in the above identified patent and that said Letters Patent are hereby corrected as shown below:

Column 5, line 52, and column 6, line 36, "acetal", each occurrence, should read -- formal --.

Signed and sealed this 10th day of February 1970.

(SEAL)

Attest:

Edward M. Fletcher, Jr.

Attesting Officer

WILLIAM E. SCHUYLER, JR.

Commissioner of Patents